US009819179B2

(12) United States Patent
Nakagawa et al.

(10) Patent No.: US 9,819,179 B2
(45) Date of Patent: Nov. 14, 2017

(54) AIRCRAFT ELECTRIC POWER SYSTEM

(71) Applicants: NABTESCO CORPORATION, Tokyo (JP); IHI AEROSPACE CO., LTD., Tokyo (JP)

(72) Inventors: Shingo Nakagawa, Fuwa-gun (JP); Yoichi Yamamoto, Fuwa-gun (JP); Hitoshi Oyori, Koto-ku (JP)

(73) Assignees: NABTESCO CORPORATION, Tokyo (JP); IHI AEROSPACE CO., LTD., Tokyo (JP)

( * ) Notice: Subject to any disclaimer, the term of this patent is extended or adjusted under 35 U.S.C. 154(b) by 534 days.

(21) Appl. No.: 14/470,219

(22) Filed: Aug. 27, 2014

(65) Prior Publication Data

US 2015/0061378 A1    Mar. 5, 2015

(30) Foreign Application Priority Data

Aug. 30, 2013 (JP) .................................. 2013-180120

(51) Int. Cl.
| | |
|---|---|
| B60L 1/00 | (2006.01) |
| H02J 1/08 | (2006.01) |
| H02J 1/10 | (2006.01) |
| H02J 1/12 | (2006.01) |
| H02J 4/00 | (2006.01) |
| H02J 7/34 | (2006.01) |
| H02J 1/00 | (2006.01) |

(52) U.S. Cl.
CPC ................ *H02J 1/08* (2013.01); *H02J 1/102* (2013.01); *H02J 1/12* (2013.01); *H02J 4/00* (2013.01); *H02J 7/34* (2013.01); *H02J 2001/004* (2013.01); *H02J 2001/008* (2013.01)

(58) Field of Classification Search
USPC ......................................................... 307/9.1
See application file for complete search history.

(56) References Cited

U.S. PATENT DOCUMENTS

| 8,789,791 | B2 | 7/2014 | Matasso et al. | |
|---|---|---|---|---|
| 2006/0061213 | A1* | 3/2006 | Michalko | H02J 4/00 307/9.1 |
| 2008/0174177 | A1 | 7/2008 | Langlois et al. | |
| 2009/0224599 | A1* | 9/2009 | Yue | H02J 1/10 307/9.1 |
| 2009/0302153 | A1 | 12/2009 | Matasso et al. | |

(Continued)

FOREIGN PATENT DOCUMENTS

| GB | 2491982 A | 12/2012 |
|---|---|---|
| JP | 2011-247334 A | 12/2011 |
| JP | 2012-525815 A | 10/2012 |

OTHER PUBLICATIONS

The extended European search report issued by the European Patent Office dated Aug. 19, 2015, which corresponds to European Patent Application No. 14182677.6-1804 and is related to U.S. Appl. No. 14/470,219.

(Continued)

*Primary Examiner* — Danny Nguyen
(74) *Attorney, Agent, or Firm* — Studebaker & Brackett PC

(57) ABSTRACT

An aircraft electric power system provided in an aircraft includes a predetermined DC power supply bus for supplying electric power to a load. The DC power supply bus is configured to always be connected to two or more types of power supply devices having different forms.

9 Claims, 10 Drawing Sheets

(56) References Cited

U.S. PATENT DOCUMENTS

2010/0080027 A1    4/2010   Wiegman et al.
2010/0276992 A1   11/2010   Radun
2011/0290353 A1   12/2011   Fukui et al.
2012/0232728 A1    9/2012   Karimi et al.
2012/0318914 A1   12/2012   Rajashekara et al.

OTHER PUBLICATIONS

Mark W. Dige et al.; Electrical Power System Architectures for Future Aerospace Vehicles; SAE Technical paper 881412; Oct. 1, 1988.
An Office Action; "Notification of Reason for Rejection," issued by the Japanese Patent Office dated Jul. 7, 2017, which corresponds to Japanese Patent Application No. 2013-180120 and is related to U.S. Appl. No. 14/470,219; with English language translation.

* cited by examiner

AIRCRAFT ELECTRIC POWER SYSTEM

CROSS-REFERENCE TO RELATED APPLICATION

This application claims priority to Japanese Patent Application No. 2013-180120. The entire disclosure of Japanese Patent Application No. 2013-180120 is hereby incorporated herein by reference.

BACKGROUND OF THE INVENTION

1. Field of the Invention

The present invention relates to an aircraft electric power system.

2. Description of Related Art

Various electric devices are installed in an aircraft, and these devices are driven by an electric motor mounted in the aircraft, for example. An example of the aforementioned devices is an electric-hydraulic pump for supplying pressure oil to a hydraulically operated actuator that drives moving surfaces, as disclosed in JP2011-247334 A.

Note that moving surfaces include primary flight control surfaces configured as control surfaces such as an aileron, a rudder, and an elevator, and secondary flight control surfaces configured as a flap, a spoiler, and the like. Other examples of the aforementioned devices include an electric actuator that drives the aforementioned moving surfaces, legs (mechanisms that support an airframe of an aircraft on the ground) of landing gear (undercarriage), and the like.

An electric actuator is also known as an actuator that drives moving surfaces. An electric actuator has a screw mechanism, for example, and a rod in the screw mechanism is displaced due to the driving force of an electric motor. A moving surface is displaced by this displacement of the rod.

For example, the electric motor in the aforementioned electric actuator requires a large current (inertial acceleration current) in order to start displacement of a moving surface. That is to say, when starting an operation of the electric motor, a large current (transient current) needs to be generated instantaneously in order to generate an inertial acceleration current. Moreover, in the case of simultaneously operating a plurality of electric actuators, a plurality of electric motors simultaneously begin to operate, and a larger current needs to be generated instantaneously in an aircraft.

For this reason, in general, an aircraft needs to have a large power unit in order to generate the aforementioned large current. Furthermore, an aircraft needs buses having a large cross-sectional area in order to distribute the aforementioned large current to electric motors. Consequently, the gross weight of the airframe of an aircraft increases. Since there is significant demand for a reduction in aircraft weight, there is significant demand to further reduce the weight of the devices in the aircraft.

In view of the foregoing situation, an object of the present invention is to provide an aircraft electric power system with which a large amount of electric power can be supplied to a load while suppressing an increase in size of a power unit and the like.

SUMMARY OF THE INVENTION (1) An aircraft electric power system according to an aspect of the present invention for achieving the above-stated object is the aircraft electric power system provided in an aircraft, the aircraft electric power system includes: a predetermined DC power supply bus for supplying electric power to a load, wherein the DC power supply bus is configured to always be connected to two or more types of power supply devices having different forms.

With this configuration, for example, when an electric motor in an electric actuator serving as a load for driving a moving surface operates for attitude control for the aircraft, there are cases where a large current (inertial acceleration current) is temporarily required in order to start the operation with a large torque that can act against a large resisting force such as air resistance. In these cases, the aforementioned large current can be supplied to the electric motor as a result of electric power being output to the electric motor simultaneously from the power supply devices having different forms via the DC power supply bus. Accordingly, the aforementioned large current does not need to be generated with one main power unit. Accordingly, the size of the power supply device can be further reduced. Furthermore, the power supply devices are separately disposed. Thus, line loss (power loss) of the DC power supply bus can be further reduced. In particular, since the bus length in the aircraft is extremely long, a reduction in the line loss has an extremely large effect. Consequently, the size (weight) of the power supply devices can be further reduced. As a result, with this configuration, an aircraft electric power system can be provided with which a large amount of electric power can be supplied to the load while suppressing an increase in the size of a power unit and the like.

(2) Preferably, one of the power supply devices includes a main power unit driven by an engine for applying a thrust force to the aircraft, and another of the power supply devices includes an electricity storage device capable of storing and discharging electricity.

With this configuration, if the load instantaneously requires a large amount of electric power, a large amount of electric power can be supplied to the load by cooperation between the main power unit and the electricity storage device. If the electric power required by the load is relatively small, the load can be operated with electric power generated by the main power unit. With this configuration, the rated output of the main power unit can be further reduced. Accordingly, the size and weight of the main power unit and the engine for driving the main power unit can be further reduced.

(3) More preferably, the electric power system further includes an electricity storage control device for controlling the electricity storage device, wherein the electricity storage control device controls an operation of the electricity storage device in accordance with a state of power consumption by one or more loads connected to the DC power supply bus.

With this configuration, the electricity storage control device can set the amount of electricity discharge from the electricity storage device in accordance with the state of power consumption by the load. Thus, electric power stored in the electricity storage device can be used more efficiently. Consequently, the electricity storage device does not need to store an unnecessarily large amount of electric power. Accordingly, the size of the electricity storage device can be further reduced.

(4) More preferably, the electricity storage control device can cause the electricity storage device to perform an electricity discharging operation if necessary electric power required by the one or more loads exceeds a predetermined value.

With this configuration, for example, if a large amount of electric power that exceeds the maximum value of the electric power that can be supplied from the main power unit to the load needs to be supplied to the load, the electricity storage control device can cause the electricity storage device to perform the electricity discharging operation. Thus, the necessary electric power can be stably supplied to the load, and the rated output of the main power unit can be further reduced.

(5) Preferably, the electricity storage control device can cause the electricity storage device to perform an electricity storing operation if necessary electric power required by the one or more loads is smaller than or equal to a predetermined value.

With this configuration, the electricity storage control device can cause the electricity storage device to perform the electricity storing operation while electric power supply to the load is not necessary.

(6) Preferably, a plurality of the predetermined DC power supply buses are provided, and one of the predetermined DC power supply buses and another of the predetermined DC power supply buses are connected to each other such that electric power can be transmitted and received therebetween.

With this configuration, the power supply path to the load can be formed into a smart grid. That is to say, the power supply path to the load can be multiplexed. Consequently, a situation where the power supply capacity is significantly lost due to a failure or the like of one power unit can be suppressed. Accordingly, a more reliable electric power system with which electric power can be more reliably supplied to the load can be realized. Furthermore, for example, if a configuration in which AC power supply buses are electrically connected to each other is employed, it is difficult to adjust the power supply phase and the voltage level for balancing the load of electric power between the AC power supply buses. In contrast, with the configuration in which the DC power supply buses are connected to each other, such an adjustment operation that requires time and effort is not necessary, and a smart grid can be realized with a simpler configuration.

(7) More preferably, one of the predetermined DC power supply buses is a DC power supply bus that is connected only to a flight control system for supplying electric power to a flight control device for controlling a flight of the aircraft.

With this configuration, a DC power supply bus dedicated to the flight control device is provided. For this reason, the influence of voltage fluctuations caused by devices other than the flight control devices reaching the flight control device can be suppressed. Consequently, electric power can be more reliably supplied stably to the flight control device. Furthermore, for example, with the configuration in which DC power is supplied to the electric actuator in the flight control system, line loss (power loss) can be further reduced as compared with the case of supplying AC power to the electric actuator.

(8) More preferably, one of the predetermined DC power supply buses and another of the predetermined DC power supply buses are connected to each other such that electric power can be transmitted and received therebetween, via an electricity storage device capable of storing and discharging electricity.

With this configuration, as a result of the electricity storage device, which is disposed between the DC power supply buses, functioning as an accumulator, an occurrence of an instable voltage fluctuation caused due to electric power interchange between the DC power supply buses can be suppressed.

(9) More preferably, the electricity storage device includes a flywheel battery.

With this configuration, the flywheel battery can temporarily convert electric power from one of the DC power supply buses into kinetic energy of the flywheel, thereafter convert this kinetic energy into electric power, and then output the electric power to another of the DC power supply buses. With this configuration, it is possible to suppress the occurrence of direct electric connection between one of the DC power supply buses and another of the DC power supply buses. That is to say, electric insulation between one of the DC power supply buses and another of the DC power supply buses can be realized. Accordingly, it is possible to more reliably suppress the occurrence of an instable voltage fluctuation caused due to interchange of electric power between the DC power supply buses.

(10) More preferably, the electric power system further comprising an electricity storage control device for controlling the electricity storage device, wherein the electricity storage control device can operate the electricity storage device so as to distribute electric power from a DC power supply bus among the predetermined DC power supply buses that has a relatively larger reserve capacity of electric power distribution to the electricity storage device, and can also cause electric power to be output from the electricity storage device to a DC power supply bus among the predetermined DC power supply buses that has a relatively smaller reserve capacity of electric power distribution.

With this configuration, biasing of electric power loads between the DC power supply buses can be further reduced. Accordingly, the rated output of each power supply device can be further reduced, and consequently the size and weight of each power supply device can be further reduced.

(11) Preferably, one of the power supply devices includes a plurality of main power units driven by an engine for applying a thrust force to the aircraft, and the main power units are connected to the DC power supply bus.

With this configuration, even if one of the main power units has failed, electric power can be supplied from another of the main power units. Accordingly, electric power can be more reliably supplied to the load.

Note that the above and other objects, features, and advantages of the present invention will become apparent by reading the following description with the accompanying drawings.

DETAILED DESCRIPTION OF THE INVENTION

First Embodiment

Hereinafter, a mode for carrying out the present invention will be described with reference to the drawings.

Figure 1:
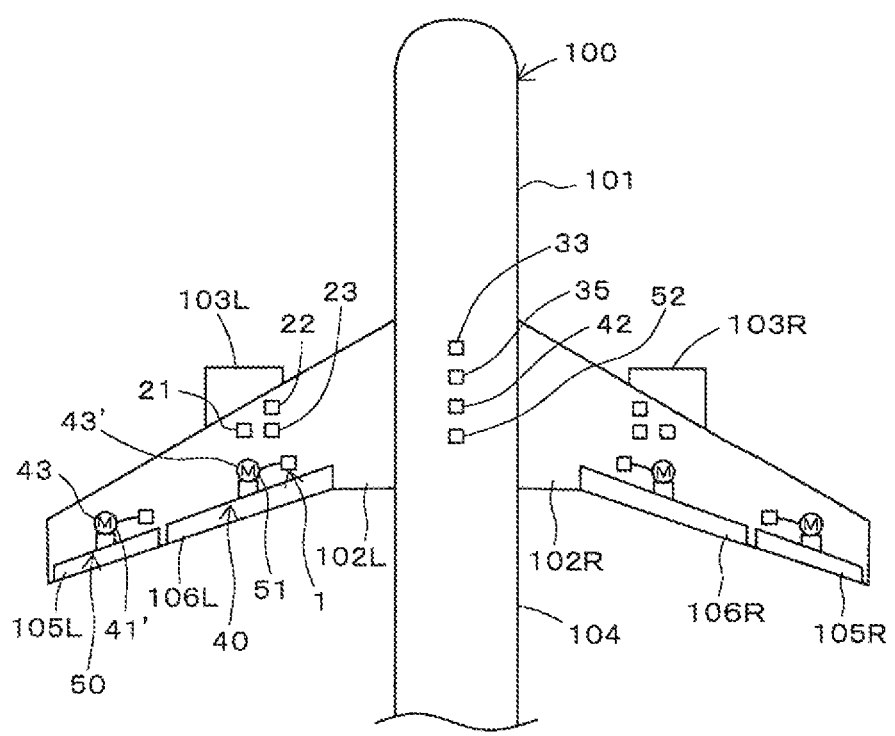
FIG. 1 is a schematic view showing a part of an aircraft having an electric power system according to a first embodiment of the present invention.
Figure 2:
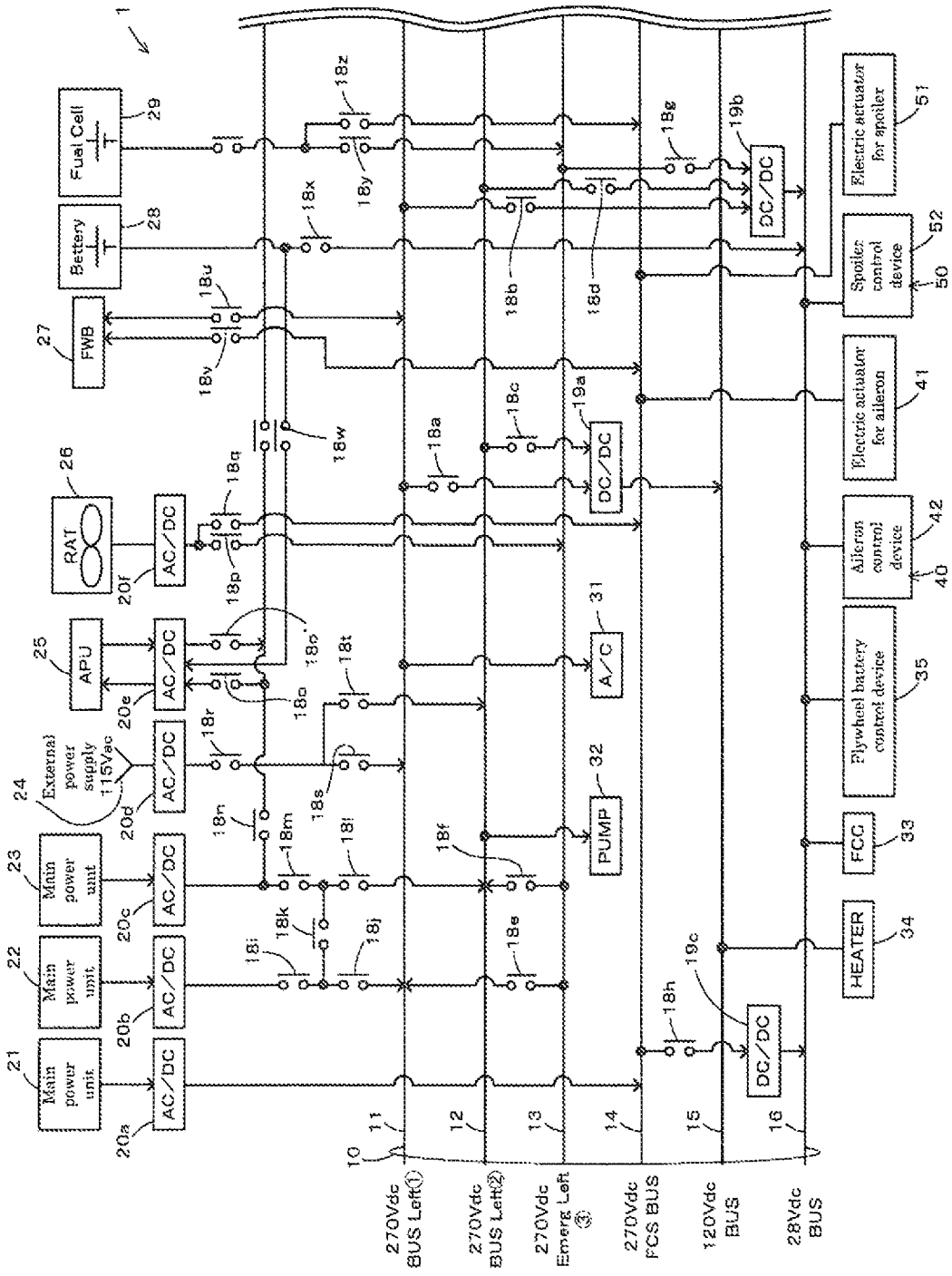
FIG. 2 is a schematic view of a configuration of the electric power system.

FIG. 1 is a schematic view showing a part of an aircraft 100 having an electric power system 1 according to a first embodiment of the present invention. Note that FIG. 1 shows a front part and an intermediate part of an airframe 101 of the aircraft 100, and omits a rear part of the airframe 101. FIG. 2 is a schematic view of a configuration of the electric power system 1.

Referring to FIG. 1, the aircraft 100 is a passenger aircraft, for example. The aircraft 100 includes the airframe 101, a pair of engines 103L and 103R, namely a left engine 103L and a right engine 103R, and the electric power system 1.

The airframe 101 has a body 104 and a pair of main wings 102L and 102R, namely a left main wing 102L and a right main wing 102R, connected to the body 104.

The main wings 102L and 102R are provided with ailerons 105L and 105R and spoilers 106L and 106R, respectively, as control surfaces. The ailerons 105L and 105R and the spoilers 106L and 106R are operated by later-described electric actuators 41 and 51 and the like.

The engines 103L and 103R are jet engines for applying a propelling force to the airframe 101, for example, and are turbofan engines in the present embodiment. The engines 103L and 103R are attached to the main wings 102L and 102R, respectively. The engines 103L and 103R each have a rotary shaft (not shown). The engines 103L and 103R are also used to generate electric power to be consumed in the electric power system 1.

Note that in the electric power system 1, a configuration related to a left board part of the airframe 101 is similar to a configuration related to a right board part of the airframe 101. Accordingly, in the present embodiment, the configuration related to the left board part of the airframe 101 in the electric power system 1 will be mainly described, and part of the description of the configuration related to the right board part of the airframe 101 in the electric power system 1 will be omitted.

Referring to FIGS. 1 and 2, the electric power system 1 in the present embodiment has a smart grid function, and electric power interchange among later-described DC buses 10 can be performed. The electric power system 1 also has an integrated electric power management system using the DC buses 10 and a smart meter function, and is configured to optimize electric power supply in accordance with the operational state of a later-described electric actuator 41.

Thus, the electric power system 1 in the present embodiment is configured to be able to efficiently supply and distribute electric power, thereby achieving a reduction in the life cycle cost (LCC) of the aircraft 100. A specific configuration of the electric power system 1 will now be described.

The electric power system 1 has a plurality of DC buses 10 (11 to 16), a plurality of main power units 21, 22, and 23, an external power supply connection unit 24, an auxiliary power unit (APU) 25, a ram air turbine (RAT) 26, a flywheel battery (FWB) 27, a battery 28, and a fuel battery 29.

Each of the DC buses 10 (11 to 16) is an electric power system component that is provided in order to distribute electric power to a load (electric device), and is formed using electric wires or the like.

The DC buses 10 each have a first high-voltage bus 11, a second high-voltage bus 12, an emergency high-voltage bus 13, an FCS (flight control system) high-voltage bus 14, a medium-voltage bus 15, and a low-voltage bus 16. All these DC buses 11 to 16 are used to distribute DC power.

The high-voltage buses 11 to 14 are buses for high-voltage power, and are provided for 270-V DC power in the preset embodiment. The FCS high-voltage bus 14 is provided as a DC bus for a flight control system, and is configured to distribute electric power to devices (an electric motor 43 in a later-described aileron drive apparatus 40, etc.) related to flight control for the airframe 101, among electric devices. The FCS high-voltage bus 14 is connected only to the flight control system.

On the other hand, among the buses 10, the buses 11 to 13, 15, and 16 other than the FCS high-voltage bus 14 are provided in order to supply electric power to electric devices other than flight control devices. The first high-voltage bus 11 and the second high-voltage bus 12 are configured to distribute electric power to devices that are not directly related to attitude control for the airframe 101, among high-voltage (DC 270-V) electric devices.

The first high-voltage bus 11 is connected to, an air conditioner 31 serving as an electric device, for example, and supplies electric power to this air conditioner 31. The air conditioner 31 is used for temperature adjustment in a passenger cabin of the airframe 101. Note that, although not shown, the first high-voltage bus 11 is also connected to a plurality of electric devices other than the air conditioner 31.

The first high-voltage bus 11 is electrically connected to the medium-voltage bus 15 via a switch 18a and a DC/DC converter 19a, and distributes electric power to the medium-voltage bus 15 by the switch 18a being turned on. Note that each switch 18 is a switch for switching between a conductive state and an insulating state. The voltage of the electric power to be distributed from the first high-voltage bus 11 to the medium-voltage bus 15 is lowered to the voltage for the medium-voltage bus 15 by the DC/DC converter 19a, and is thereafter supplied to the medium-voltage bus 15.

The first high-voltage bus 11 is also electrically connected to the low-voltage bus 16 via a switch 18b and a DC/DC converter 19b, and distributes electric power to the low-voltage bus 16 by the switch 18b being turned on. Note that the voltage of the electric power to be distributed from the first high-voltage bus 11 to the low-voltage bus 16 is lowered to the voltage for the low-voltage bus 16 by the DC/DC converter 19b, and is thereafter supplied to the low-voltage bus 16.

The second high-voltage bus 12 is connected to, for example, an electric fuel pump 32 serving as an electric device, and supplies electric power to this electric fuel pump 32. The electric fuel pump 32 includes an electric motor for driving a pump, and is installed in a fuel tank (not shown) within the main wing 102L. The electric fuel pump 32 is driven in order to supply fuel in the fuel tank to the engines 103L and 103R. Note that, although not shown, the second high-voltage bus 12 is also connected to a plurality of electric devices other than the electric fuel pump 32.

The second high-voltage bus 12 is also electrically connected to the medium-voltage bus 15 via a switch 18c and a DC/DC converter 19a, and distributes electric power to the medium-voltage bus 15 by the switch 18*c* being turned on. Note that the voltage of the electric power to be distributed from the second high-voltage bus 12 to the medium-voltage bus 15 is lowered to the voltage for the medium-voltage bus 15 by the DC/DC converter 19*a*, and is thereafter supplied to the medium-voltage bus 15.

The second high-voltage bus 12 is also electrically connected to the low-voltage bus 16 via a switch 18*d* and the DC/DC converter 19*b*, and distributes electric power to the low-voltage bus 16 by the switch 18*d* being turned on. Note that the voltage of the electric power to be distributed from the second high-voltage bus 12 to the low-voltage bus 16 is lowered to the voltage for the low-voltage bus 16 by the DC/DC converter 19*b*, and is thereafter supplied to the low-voltage bus 16.

The emergency high-voltage bus 13 is provided as an emergency bus, and for example, when there is an abnormality in at least one of the first high-voltage bus 11, the second high-voltage bus 12, and the low-voltage bus 16, the emergency high-voltage bus 13 is configured to distribute electric power to the first high-voltage bus 11, the second high-voltage bus 12, and the low-voltage bus 16 in which the abnormality occurred.

The emergency high-voltage bus 13 is connectable to the first high-voltage bus 11 via a switch 18*e*, and distributes electric power to the first high-voltage bus 11 by the switch 18*e* being turned on. Similarly, the emergency high-voltage bus 13 is connectable to the second high-voltage bus 12 via a switch 18*f*, and distributes electric power to the second high-voltage bus 12 by the switch 18*f* being turned on. The emergency high-voltage bus 13 is also connected to the low-voltage bus 16 via a switch 18*g* and the DC/DC converter 19*b*, and distributes electric power to the low-voltage bus 16 by the switch 18*g* being turned on. Note that the voltage of the electric power to be distributed from the emergency high-voltage bus 13 to the low-voltage bus 16 is lowered to the voltage for the low-voltage bus 16 by the DC/DC converter 19*b*, and is thereafter supplied to the low-voltage bus 16.

The FCS high-voltage bus 14 is connected to the electric actuator 41 in the aileron drive apparatus 40 serving as an electric device included in the flight control system. The FCS high-voltage bus 14 is also connected to the electric actuator 51 in a spoiler drive apparatus 50 serving as an electric device included in the flight control system.

The FCS high-voltage bus 14 is also electrically connected to the low-voltage bus 16 via a switch 18*h* and a DC/DC converter 19*c*, and distributes electric power to the low-voltage bus 16 by the switch 18*h* being turned on. Note that the voltage of the electric power to be distributed from the FCS high-voltage bus 14 to the low-voltage bus 16 is lowered to the voltage for the low-voltage bus 16 by the DC/DC converter 19*c*, and is thereafter supplied to the low-voltage bus 16.

The medium-voltage bus 15 is provided in order to distribute 120-V DC power, for example. A heater 34 serving as an electric device that operates at the same voltage as that of the medium-voltage bus 15 is connected to the medium-voltage bus 15. Note that the medium-voltage bus 15 is also connected to a plurality of electric devices other than the heater 34.

The low-voltage bus 16 is provided in order to distribute 28-V DC power. The low-voltage bus 16 is connected to electric devices that operate at the same voltage as that of the low-voltage bus 16. The low-voltage bus 16 is connected to a flight control computer (FCC) 33 and the like that serve as electric devices included in the flight control system.

The DC buses 10 having the above-described configuration are configured such that electric power can be supplied thereto from the main power units 21, 22, and 23, the external power supply connection unit 24, the auxiliary power unit 25, the ram air turbine 26, the flywheel battery 27, the battery 28, and the fuel battery 29.

The main power units 21, 22, and 23, the auxiliary power unit 25, the ram air turbine 26, the flywheel battery 27, the battery 28, and the fuel battery 29 are provided as power supply devices, and are configured to to supply electric power to be consumed in the electric power system 1. Note that although the main power units 21, 22, and 23, the auxiliary power unit 25, the ram air turbine 26, the battery 28, and the fuel battery 29 are provided as elements of the electric power system 1 in the present embodiment, this need not be the case. The main power units 21, 22, and 23, the auxiliary power unit 25, the ram air turbine 26, the battery 28, and the fuel battery 29 do not have to be included in the electric power system 1.

The main power units 21, 22, and 23 are provided as main power supply devices, and are AC power units in the present embodiment. The main power units 21, 22, and 23 are driven by the engine 103L for applying a thrust force to the aircraft 100.

The main power unit 21 is provided mainly as a power unit dedicated to the flight control system. The main power unit 21 is configured to be driven by the rotational force of the rotary shaft of the engine 103L. AC power generated by the main power unit 21 is converted into high-voltage (270-V) DC power by an AC/DC converter 20*a*, and is thereafter supplied to the FCS high-voltage bus 14.

The main power unit 22 is configured to be driven by the rotational force of the rotary shaft of the engine 103L. AC power generated by the main power unit 22 is converted into high-voltage DC power by an AC/DC converter 20*b*, and is thereafter supplied to the first high-voltage bus 11 via switches 18*i* and 18*j*. The AC power generated by the main power unit 22 is also supplied to the second high-voltage bus 12 via the AC/DC converter 20*b* and switches 18*i*, 18*k*, and 18*l*.

The main power unit 23 is configured to be driven by the rotational force of the rotary shaft of the engine 103L. AC power generated by the main power unit 23 is converted into high-voltage DC power by an AC/DC converter 20*c*, and is thereafter supplied to the first high-voltage bus 11 via switches 18*m*, 18*k*, and 18*j*. The AC power generated by the main power unit 23 is also supplied to the second high-voltage bus 12 via the AC/DC converter 20*c* and the switches 18*m* and 18*l*. The AC power generated by the main power unit 23 can also be supplied to the auxiliary power unit 25 via the AC/DC converter 20*c*, switches 18*n* and 18*o*, and an AC/DC converter 20*e*. The electric power is supplied from the main power unit 23 to the auxiliary power unit 25 when, for example, the auxiliary power unit 25 is activated.

The auxiliary power unit 25 is provided as an auxiliary power supply device, and is a gas turbine engine in the present embodiment. Note that the auxiliary power unit 25 may be formed using a different motor, such as a diesel engine. The auxiliary power unit 25 is activated using electric power from the main power unit 23 or electric power from the battery 28. The electric power from the main power unit 23 or the electric power from the battery 28 is converted from DC power into AC power by the AC/DC converter 20*e*, and is supplied to the auxiliary power unit 25.

Upon the auxiliary power unit 25 being activated, electric power is generated by a power unit provided in the auxiliary power unit 25. The electric power generated by the auxiliary power unit 25 is applied to a power line starting from the main power unit 23, via the AC/DC converter 20e and switches 18o' and 18n, and can thereby be supplied to the first high-voltage bus 11 and the second high-voltage bus 12. The ram air turbine 26 is configured to start electric power generation if abnormalities occur in the auxiliary power unit 25 and the main power units 21, 22, and 23 during a flight of the aircraft 100.

The ram air turbine 26 is provided as an emergency power unit. The ram air turbine 26 includes an AC power unit and a turbine that jumps out from the airframe 101 in the case where abnormalities occur in the auxiliary power unit 25 and the main power units 21, 22, and 23 during a flight of the aircraft 100. The AC power unit in the ram air turbine 26 is configured to generate electric power by this turbine receiving wind force and rotating. The AC power generated by the ram air turbine 26 is converted into DC power by an AC/DC converter 20f, and is supplied to the emergency high-voltage bus 13 via a switch 18p and also to the FCS high-voltage bus 14 via a switch 18q.

The external power supply connection unit 24 is provided in order to receive electric power from the outside of the aircraft 100 when the aircraft 100 is parked (stopped), for example. The external power supply connection unit 24 is configured to be connectable to power supply equipment in an airport, for example. AC power applied from the external power supply connection unit 24 is converted into DC power by an AC/DC converter 20d, and is thereafter supplied to the first high-voltage bus 11 and the second high-voltage bus 12 via switches 18r, 18s and 18t.

The flywheel battery 27 is provided as an electricity storage device (secondary power supply device) capable of storing and discharging electricity, and is an inverter-controlled power supply device in the present embodiment. The flywheel battery 27 is an energy converter device that performs conversion between kinetic energy and electric power, and is configured to be able to store electric power as kinetic energy.

The flywheel battery 27 has a function of an accumulator that temporarily stores electricity. In the present embodiment, the flywheel battery 27 is configured to be able to temporarily supply electric power to the electric actuator 41 while electric power from the main power unit 21 is applied to the electric actuator 41.

The flywheel battery 27 is connectable to the first high-voltage bus 11 via a switch 18u, and is also connectable to the FCS high-voltage bus 14 via a switch 18v. The flywheel battery 27 is configured such that electric power can be supplied thereto from the first high-voltage bus 11 and the FCS high-voltage bus 14, and is configured to be able to supply electric power to the first high-voltage bus 11 and the FCS high-voltage bus 14. As a result of this configuration being employed, the first high-voltage bus 11 and the FCS high-voltage bus 14 are connected to each other by the flywheel battery 27 so as to be able to transmit and receive electric power.

With the above configuration, the DC buses 10 are configured to always be electrically connected to two or more types of power supply devices having different forms. Specifically, the first high-voltage bus 11 is configured to always be connected to the main power units 22 and 23 and the flywheel battery 27 via the switch 18. The FCS high-voltage bus 14 is configured to always be connected to the main power unit 21, the flywheel battery 27, and the fuel battery 29 via the switch 18.

Figure 3:
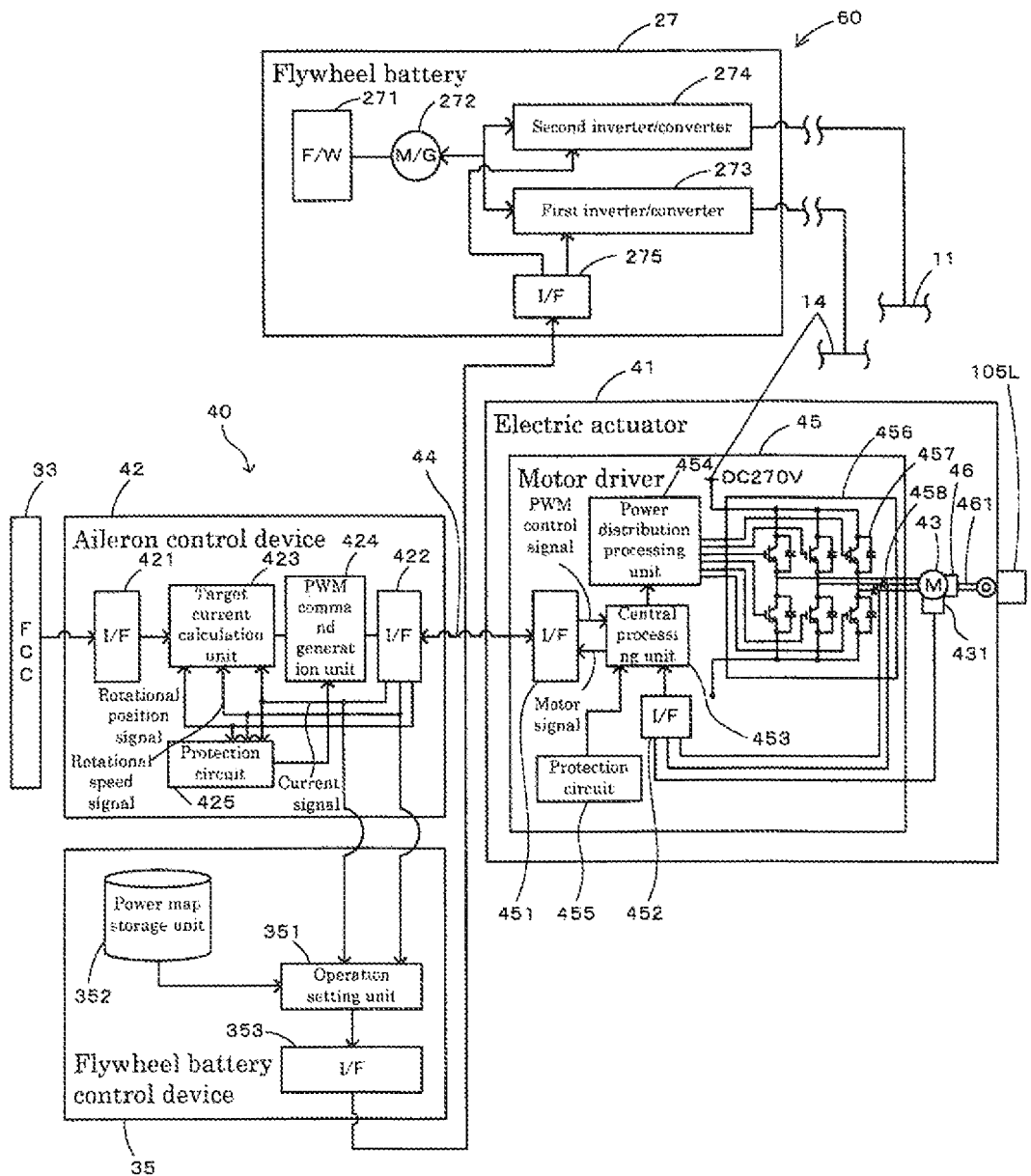
FIG. 3 is a schematic view showing a configuration of a flight control computer and an aileron drive apparatus.

FIG. 3 is a schematic view showing a configuration of a flight control computer 33 and the aileron drive apparatus 40. Referring to FIGS. 1 to 3, the flywheel battery 27 forms a flywheel battery unit 60 together with a flywheel battery control device 35. In other words, the flywheel battery unit 60 has the flywheel battery 27 and the flywheel battery control device 35.

The flywheel battery 27 has a flywheel 271, a motor generator 272, a first inverter/converter 273, a second inverter/converter 274, and an interface unit 275.

The flywheel 271 is provided as a kinetic energy accumulating member, and is configured to rotate and thereby store kinetic energy. The flywheel 271 is connected to a rotary shaft of the motor generator 272 and rotates together with this rotary shaft.

The motor generator 272 has a rotor, the aforementioned rotary shaft capable of rotating integrally with the rotor, and a stator that surrounds the rotor. When electric power is applied to the motor generator 272, the motor generator 272 operates as a motor and thereby rotates the rotary shaft and rotates the flywheel 271. Thus, kinetic energy is accumulated in the flywheel 271. On the other hand, when kinetic energy (rotational energy) of the flywheel 271 is applied to the motor generator 272, the motor generator 272 operates as a power unit, and outputs AC power to the first inverter/converter 273 or the second inverter/converter 274.

The first inverter/converter 273 and the second inverter/converter 274 are configured to convert DC power into AC power when DC power is applied thereto, and to convert AC power into DC power when AC power is applied thereto.

The first inverter/converter 273 is connected to the motor generator 272 and the FCS high-voltage bus 14. If a predetermined control signal is given from the flywheel battery control device 35 to the first inverter/converter 273 via the interface unit 275, the first inverter/converter 273 can convert AC power from the motor generator 272 into DC power and output this DC power to the FCS high-voltage bus 14.

The second inverter/converter 274 is connected to the motor generator 272 and the first high-voltage bus 11. If a predetermined control signal is given from the flywheel battery control device 35 to the second inverter/converter 274 via the interface unit 275, the second inverter/converter 274 can convert DC power from the first high-voltage bus 11 into AC power and output this AC power to the motor generator 272. The first inverter/converter 273 and the second inverter/converter 274 are controlled by the flywheel battery control device 35. A configuration of the flywheel battery control device 35 will be described later.

The battery 28 is a secondary battery such as a lithium-ion storage battery. The battery 28 is connected to the auxiliary power unit 25 via a switch 18w and the AC/DC converter 20e. The battery 28 supplies electric power to the auxiliary power unit 25 when, for example, the main power units 22 and 23 are not driven and the auxiliary power unit 25 is activated. The battery 28 is also connected to the low-voltage bus 16 via a switch 18x, and can supply electric power to the low-voltage bus 16.

The fuel battery 29 is provided mainly as a power supply device used in case of emergency, such as when electric power supply from the main power units 21, 22, and 23 to the FCS high-voltage bus 14 is shut off. The fuel battery 29 is a battery that generates electric power by using an electrochemical reaction. The fuel battery 29 cooperates with the flywheel battery 27 and the battery 28 to form a decentralized power supply device. The fuel battery 29 is connectable to the emergency high-voltage bus 13 via a switch 18y, and can supply electric power to the emergency high-voltage bus 13. The fuel battery 29 is connected to the FCS high-voltage bus 14 via a switch 18z, and can supply electric power to the FCS high-voltage bus 14.

Next, a description will be given of a more detailed configuration of the aileron drive apparatus 40 and the spoiler drive apparatus 50 provided in the electric power system 1. The aileron drive apparatus 40 and the spoiler drive apparatus 50 are provided as aircraft electric actuator drive apparatuses.

The aileron drive apparatus 40 has the electric actuator 41, an aileron control device 42, and the flywheel battery unit 60. The electric actuator 41 includes the electric motor 43.

In the present embodiment, the aileron control device 42 is disposed together with the flight control computer 33 within the body 104 of the airframe 101. The aileron control device 42 and the flight control computer 33 are connected to the low-voltage bus 16, and are configured to operate using electric power from the low-voltage bus 16.

The flight control computer 33 has a CPU (Central Processing Unit), a RAM (Random Access Memory), a ROM (Read Only Memory), and the like, and is provided as an integrated control unit related to a flight of the aircraft 100. The flight control computer 33 is configured to output a predetermined control signal, based on a signal that is output from a control stick (not shown) or the like. For example, if a command for operating an aileron 105L is given from the control stick to the flight control computer 33, the flight control computer 33 outputs a control signal for operating the aileron drive apparatus 40 to the aileron control device 42.

The aileron control device 42 is provided as an electric actuator control device that controls the electric actuator 41. The aileron control device 42 is formed using a CPU, a RAM, a ROM, and the like, and is configured to generate a control signal for causing the electric actuator 41 to perform an operation in accordance with the control signal from the flight control computer 33. The aileron control device 42 generates a control signal for driving the electric actuator 41, based on the control signal that is output from the flight control computer 33 and motor signals from the electric motor 43.

The aileron control device 42 has interface units 421 and 422, a target current calculation unit 423, a PWM command generation unit 424, and a protection circuit 425.

The interface unit 421 receives the control signal that is output from the flight control computer 33, and outputs this control signal to the target current calculation unit 423. The target current calculation unit 423 calculates a target current value based on feedback control using a rotational position signal, a rotational speed signal, and a current signal of the electric motor 43.

Note that the aforementioned rotational position signal is a signal indicating the position of a rotary shaft of the electric motor 43. The aforementioned rotational speed signal is a signal indicating the rotational speed of the rotary shaft of the electric motor 43. The aforementioned current signal is a signal indicating the value of a current that flows through the electric motor 43. The aforementioned target current value corresponds to the value of a current to be applied to the electric motor 43. The calculated target current value is output to the PWM command generation unit 424.

The PWM command generation unit 424 performs pulse width modulation control (PWM control) in order that the same current as that of the target current value flows through the electric motor 43. The PWM command generation unit 424 generates a PWM control signal to be output to a later-described motor driver 45 in the electric actuator 41, based on the target current value, and outputs this PWM control signal to the interface unit 422. The interface unit 422 outputs the PWM control signal to the electric actuator 41.

The interface unit 422 is configured to receive, from the motor driver 45, the rotational position signal, the rotational speed signal, and the current signal of the electric motor 43. The interface unit 422 outputs the aforementioned rotational position signal, rotational speed signal, and current signal to the target current calculation unit 423 and the protection circuit 425. The interface unit 422 also outputs the aforementioned rotational speed signal and current signal to the flywheel battery control device 35.

The electric actuator 41 is connected to the FCS high-voltage bus 14, and is configured to be driven using electric power from the main power unit 21. In the present embodiment, the electric actuator 41 is configured to be driven using electric power that is temporarily applied from the flywheel battery 27. In the present embodiment, the electric actuator 41 and the aileron control device 42 are separately disposed. Specifically, the electric actuator 41 is disposed in the main wing 102L, and the aileron control device 42 is disposed in the body 104. Furthermore, the electric actuator 41 and the aileron control device 42 are communicably connected to each other via a communication line 44.

The electric actuator 41 has the electric motor 43, the motor driver 45, and a motion conversion mechanism 46.

In the present embodiment, the electric motor 43, the motor driver 45, and the motion conversion mechanism 46 are all disposed in the main wing 102L, and are all disposed adjacent to one another.

The motor driver 45 is provided in order to distribute electric power to the electric motor 43, based on the PWM control signal given from the aileron control device 42.

The motor driver 45 has interface units 451 and 452, a central processing unit 453, a power distribution processing unit 454, a protection circuit 455, and a three-phase inverter circuit 456.

The interface unit 451 is communicably connected to the interface unit 422 in the aileron control device 42 via the communication line 44. The interface unit 452 is communicably connected to the central processing unit 453.

The central processing unit 453 is formed using a PLD (Programmable Logic Device), for example. The central processing unit 453 is configured to output, to the power distribution processing unit 454, the PWM control signal received via the interface unit 422. The central processing unit 453 is also connected to the interface unit 452, and is configured to output, to the interface unit 451, the motor signals such as the rotational position signal, the rotational speed signal, and the current signal of the electric motor 43 that are given to the interface unit 452.

The power distribution processing unit 454 is formed using a PLD (Programmable Logic Device), for example. The power distribution processing unit 454 operates based on the PWM control signal. The power distribution processing unit 454 thereby outputs, to the three-phase inverter circuit 456, a control signal for selectively switching six switching elements 457 of the three-phase inverter circuit 456 from an off state to an on state.

The three-phase inverter circuit 456 has six switching elements 457, as mentioned above. Each switching element 457 is an IGBT (Insulated Gate Bipolar Transistor), for example. The switching elements 457 are connected to the FCS high-voltage bus 14 and a GND (grounding point), and are also connected to a stator coil of the electric motor 43. The switching elements 457 are also connected to the power distribution processing unit 454. The switching elements 457 are in a conductive state while being given the control signal from the power distribution processing unit 454, and can cause a high-voltage (270-V) current for operating the electric motor 43 to flow.

A current detection unit 458 is connected to the three-phase inverter circuit 456. The current detection unit 458 is configured to be able to detect a current that flows through the electric motor 43. A current signal from the current detection unit 458 is output to the interface unit 452.

In the present embodiment, the electric motor 43 is a three-phase AC motor, and is driven to rotate by electric power applied from the three-phase inverter circuit 456. The electric motor 43 has a rotational angle detection sensor 431 that detects the rotational angle of the rotary shaft of the electric motor 43. The rotational angle detection sensor 431 is a resolver, for example, and detects the position and the speed of the rotary shaft of the electric motor 43. A rotational position signal and a rotational speed signal from the rotational angle detection sensor 431 are output to the interface unit 452.

The interface unit 452 outputs the rotational position signal, the rotational speed signal, and the current signal of the electric motor 43 to the central processing unit 453. Thus, the rotational position signal, the rotational speed signal, and the current signal of the electric motor 43 are output to the interface unit 422 in the aileron control device 42 via the central processing unit 453 and the interface unit 451.

The electric motor 43 operates using electric power applied from the three-phase inverter circuit 456 in the motor driver 45, as mentioned above, and the rotary shaft of the electric motor 43 rotates by a predetermined amount. The rotational motion of the rotary shaft is output to the motion conversion mechanism 46.

The motion conversion mechanism 46 is provided in order to convert the rotational motion of the rotary shaft of the electric motor 43 into linear motion. The motion conversion mechanism 46 includes a ball screw mechanism, for example, and has a movable portion 461 including a male screw member. With a rotation of the rotary shaft of the electric motor 43, the movable portion 461 is displaced linearly. The movable portion 461 is connected to the aileron 105L, and the aileron 105L is displaced with the displacement of the movable portion 461.

Next, a configuration of the flywheel battery control device 35 in the flywheel battery unit 60 will be described. The flywheel battery control device 35 is provided as a secondary power supply control device (electricity storage control device) for controlling the flywheel battery 27, and is disposed in the body 104. The flywheel battery control device 35 is connected to the low-voltage bus 16 and operates using electric power from the low-voltage bus 16. In the present embodiment, the flywheel battery control device 35 operates the flywheel battery 27 in accordance with the state of power consumption by the electric motor 43 (necessary electric power required for the operation of the electric motor 43) connected to the FCS high-voltage bus 14. In the present embodiment, the flywheel battery control device 35 detects (predicts) a load of the electric motor 43 in the electric actuator 41, and operates the flywheel battery 27 based on a result of this detection.

The flywheel battery control device 35 has a CPU, a RAM, a ROM, and the like. In the present embodiment, the flywheel battery control device 35 and the aileron control device 42 are integrated with each other. That is to say, the flywheel battery control device 35 and the aileron control device 42 are formed using the same CPU, RAM, and ROM, and share the rotational speed signal and the current signal of the electric motor 43.

The flywheel battery control device 35 has an operation setting unit 351, a power map storage unit 352, and an interface unit 353.

Figure 4:
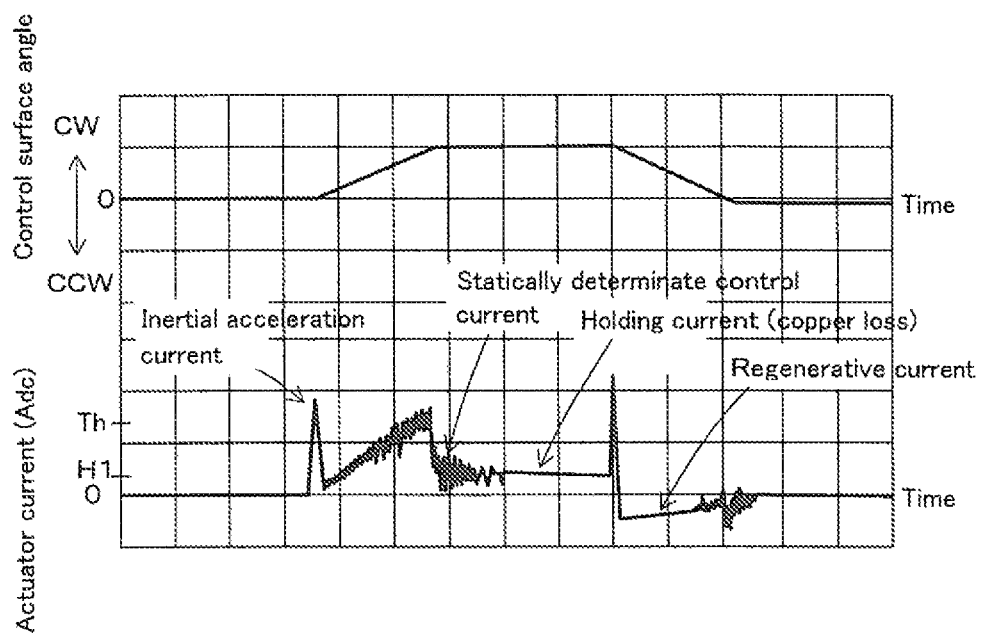
FIG. 4 is a diagram showing an exemplary map for illustrating properties of electric power that is needed at the time of driving an electric motor in an electric actuator.

The power map storage unit 352 stores a map indicating properties of necessary electric power at the time of driving the electric motor 43 in the electric actuator 41. An example of this map is shown in FIG. 4. FIG. 4 is a diagram showing an exemplary map for illustrating properties of necessary electric power at the time of driving the electric motor 43 in the electric actuator 41.

Referring to FIGS. 3 and 4, the upper graph in FIG. 4 indicates a control surface angle (angle of inclination) of the aileron 105L with respect to the main wing 102L. This graph indicates a relationship between time and the control surface angle, with the horizontal axis indicating time and the vertical axis indicating the control surface angle of the aileron 105L. The lower graph in FIG. 4 indicates the current value required by the electric motor 43. This graph indicates a relationship between time and the value of the current flowing through the electric actuator 41, with the horizontal axis indicating time and the vertical axis indicating the value of the current flowing through the electric actuator 41.

The graphs in FIG. 4 indicate changes in the case where the control surface angle of the aileron 105L is changed by a predetermined value, thereafter the control surface angle of the aileron 105L is maintained at a fixed value during a fixed time period, and then the aileron 105L is returned again to its original position.

If an operation is performed as indicated by these graphs, the electric motor 43 is instantaneously driven by a large current (inertial acceleration current) that exceeds a predetermined threshold value Th when the aileron 105L begins to operate, then is driven by a current that increases in proportion to the amount of elapsed time while the control surface angle of the aileron 105L is increased, and stops being driven when the control surface angle of the aileron 105L reaches the target value. When the electric motor 43 stops being driven, a predetermined holding current H1 is applied to the electric motor 43 and a force is thereby generated that holds the attitude of the aileron 105L. Furthermore, when the operation of the aileron 105L is started in order to return the control surface angle of the aileron 105L to its original value, the electric motor 43 is instantaneously driven by a large current (inertial acceleration current) that exceeds the predetermined threshold value Th, and thereafter operates so as to generate a regenerative current. The aileron 105L is thereby returned to its original position.

The operation setting unit 351 is configured to set an operation that the flywheel battery 27 is to be caused to perform. Specifically, the operation setting unit 351 receives, from the interface unit 422, the rotational speed signal and the current signal of the electric motor 43 that serve as information which is input to the interface unit 422 from the motor driver 45. The operation setting unit 351 then references the map (map shown in FIG. 4) stored in the power map storage unit 352 and the target current value. The operation setting unit 351 thereby detects (estimates) the operation performed by the electric motor 43, based on the present rotational speed and current value of the electric motor 43. That is to say, the operation setting unit 351 detects the current required by the electric motor 43 using feedforward control.

If it is estimated that the current value required by the electric motor 43 exceeds the predetermined threshold value Th, the operation setting unit 351 generates a control signal for supplying electric power from the flywheel battery 27 to the electric motor 43 (FCS high-voltage bus 14). The control signal in this case is a signal for commanding that a current corresponding to the difference between the current value required by the electric motor 43 and the aforementioned threshold value Th is supplied from the flywheel battery 27 to the electric motor 43. The operation setting unit 351 outputs this control signal to the interface unit 275 in the flywheel battery 27 via the interface unit 353.

On the other hand, if the current value required by the electric motor 43 is smaller than or equal to the predetermined threshold value Th, the operation setting unit 351 generates a control signal for causing the flywheel battery 27 to store electricity, and outputs this control signal to the interface unit 275 in the flywheel battery 27 via the interface unit 353.

Referring to FIGS. 1 to 3, the spoiler drive apparatus 50 has the electric actuator 51 and the spoiler control device 52.

The spoiler control device 52 is connected to the low-voltage bus 16 and operates using electric power from the low-voltage bus 16. The spoiler control device 52 is disposed in the body 104. The spoiler control device 52 has a configuration that is similar to that of the aileron control device 42, and gives a PWM control signal to the electric actuator 51, based on a control signal from the flight control computer 33.

The electric actuator 51 is connected to the FCS high-voltage bus 14, and operates using electric power from the FCS high-voltage bus 14. The electric actuator 51 has a configuration that is similar to that of the electric actuator 41 for an aileron, and is connected to the spoiler 106L. This electric actuator 51 is driven based on the PWM control signal from the spoiler control device 52, and thereby operates the spoiler 106L.

The outline configuration of the aircraft 100 is as described above. Next, an exemplary operation in the electric power system 1 in the aircraft 100 will be described.

Figure 5:
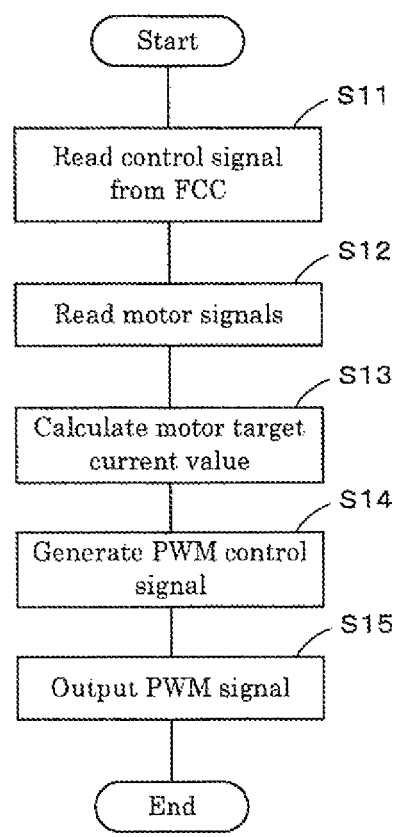
FIG. 5 is a flowchart for illustrating an exemplary flow of processing in an aileron control device.

FIG. 5 is a flowchart for illustrating an exemplary flow of processing in the aileron control device 42. Note that when a description is given below with reference to the flowchart, diagrams other than the flowchart will also be referred to as appropriate.

Referring to FIG. 5, the target current calculation unit 423 in the aileron control device 42 initially reads the control signal from the flight control computer 33 (step S11). Next, the target current calculation unit 423 reads the motor signals (rotational position signal, rotational speed signal, and current signal) of the electric motor 43 that are output from the motor driver 45 (step S12).

Next, the target current calculation unit 423 in the aileron control device 42 calculates the target current value for the electric motor 43 (step S13). Next, the PWM command generation unit 424 in the aileron control device 42 generates the PWM control signal such that a current of the same value as the target current value flows through the electric motor 43 (step S14). Next, the aileron control device 42 outputs the PWM control signal to the motor driver 45 (step S15). The aileron control device 42 repeatedly performs the above processing.

Figure 6:
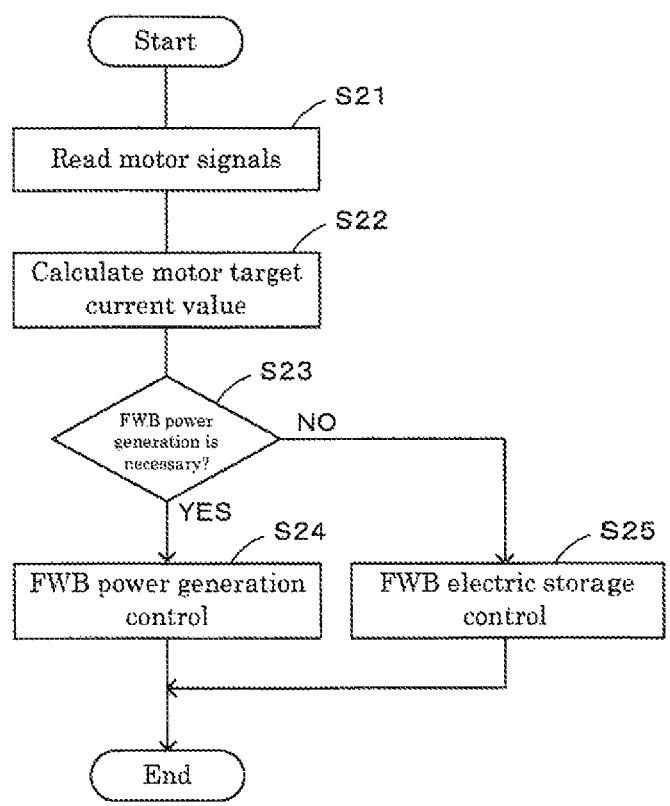
FIG. 6 is a flowchart for illustrating an exemplary flow of processing in a flywheel battery control device.

Next, an exemplary flow of processing in the flywheel battery control device 35 will be described. FIG. 6 is a flowchart for illustrating an exemplary flow of processing in the flywheel battery control device 35. Referring to FIG. 6, the operation setting unit 351 in the flywheel battery control device 35 initially reads the motor signals (rotational speed signal and current signal) of the electric motor 43 that are output from the motor driver 45 (step S21).

Next, the operation setting unit 351 references the rotational speed signal and the current signal of the electric motor 43, as well as the map stored in the power map storage unit 352, and detects (estimates) the operation performed by the electric motor 43. That is to say, the flywheel battery control device 35 calculates the target current value for the electric motor 43 (step S22). Next, the operation setting unit 351 determines whether or not a power generating operation by the flywheel battery 27 is necessary (step S23). Specifically, if the current value required by the electric motor 43 exceeds the threshold value Th (YES in step S23), the operation setting unit 351 outputs, to the flywheel battery 27, the control signal for outputting electric power from the flywheel battery 27 to the electric motor 43 (FCS high-voltage bus 14) (step S24). That is to say, the operation setting unit 351 causes the flywheel battery 27 to perform the power generating operation if the necessary electric power required by the electric motor 43 exceeds a predetermined value.

More specifically, the operation setting unit 351 outputs, to the flywheel battery 27, the control signal for causing the first inverter/converter 273 to perform an operation of converting AC power into DC power. Consequently, the AC power from the motor generator 272 that is being driven due to a rotation of the flywheel 271 is converted into DC power by the first inverter/converter 273. The DC power that is output from the first inverter/converter 273 is supplied together with DC power from the main power unit 21 to the electric motor 43 via the FCS high-voltage bus 14 and the three-phase inverter circuit 456.

On the other hand, if the current value required by the electric motor 43 is smaller than or equal to the predetermined threshold value Th (NO in step S23), the operation setting unit 351 outputs, to the flywheel battery 27, a control signal for causing the flywheel battery 27 to perform an electricity storing operation (step S25). That is to say, the operation setting unit 351 causes the flywheel battery 27 to perform the electricity storing operation if the necessary electric power required by the electric motor 43 is smaller than or equal to a predetermined value.

More specifically, the operation setting unit 351 outputs, to the flywheel battery 27, the control signal for causing the second inverter/converter 274 to perform an operation of converting DC power into AC power. Consequently, the second inverter/converter 274 operates as a three-phase inverter circuit, and drives the motor generator 272 using electric power from the first high-voltage bus 11. The rotational force is thereby applied to the flywheel 271, and accumulation of kinetic energy by the flywheel 271, that is to say, the electricity storing operation by the flywheel battery 27 is performed.

Note that if the load of the electric actuator 41 is small, the flywheel battery 27 may be caused to perform the electricity storing operation by applying electric power from the FCS high-voltage bus 14 to the flywheel battery 27. If the load such as the air conditioner 31 or the like connected to the first high-voltage bus 11 is large, electric power from the flywheel battery 27 may be output to the first high-voltage bus 11.

Electric power may be constantly transmitted and received between the flywheel battery 27 and the first high-voltage bus 11, and electric power may be constantly transmitted and received between the flywheel battery 27 and the FCS high-voltage bus 14.

As described above, with the electric power system 1 according to the present embodiment, the first high-voltage bus 11 is configured to always be connected to the flywheel battery 27 and the main power units 22 and 23 that serve as two or more types of power supply devices having different forms via the switch 18. The FCS high-voltage bus 14 is configured to always be connected to the flywheel battery 27 and the main power unit 21 that serve as two or more types of power supply devices having different forms via switch 18. With this configuration, when the electric motor 43 in the electric actuator 41 operates for attitude control for the aircraft 100, the electric motor 43 temporarily requires a large current (inertial acceleration current) in order to start operating with a large torque that can act against a large resisting force such as air resistance received by the aileron 105L. In this case, the aforementioned large current can be supplied to the electric motor 43 by electric power being output to the electric motor 43 simultaneously from the flywheel battery 27 and the main power unit 21 having a different form via the FCS high-voltage bus 14. Accordingly, the aforementioned large current does not need to be generated with one main power unit 21. For this reason, the size of the main power unit 21 can be further reduced. Furthermore, the main power units 21, 22, and 23 and the flywheel battery 27 are separately disposed. Thus, line loss (power loss) in the first high-voltage bus 11 and the FCS high-voltage bus 14 can be further reduced. In particular, since the bus length in the aircraft 100 is extremely long, a reduction in the line loss has a significantly large effect. Consequently, the size (weight) of the power supply devices (main power units 21, 22, and 23 and flywheel battery 27) can be further reduced. As a result, the aircraft electric power system 1 can be provided with which a large amount of electric power can be supplied to the electric motor 43 in the electric actuator 41 and an increase in the size of the main power units 21, 22, and 23 and the like can be suppressed.

With the electric power system 1, if the electric motor 43 instantaneously requires a large amount of electric power, a large amount of electric power can be supplied to the electric motor 43 due to cooperation between the main power unit 21 and the flywheel battery 27. If the electric power required by the electric motor 43 is relatively small, the electric motor 43 can be operated using electric power generated by the main power unit 21. With this configuration, the rated output of the main power unit 21 can be further reduced. Accordingly, the size and weight of the main power unit 21 and the engine 103L for driving the main power unit 21 can be further reduced.

With the electric power system 1, the flywheel battery control device 35 controls the operation of the flywheel battery 27 in accordance with the state of power consumption by the electric motor 43 connected to the FCS high-voltage bus 14. With this configuration, the flywheel battery control device 35 can set the amount of electricity discharge from the flywheel battery 27 in accordance with the state of power consumption by the electric motor 43. Thus, electric power stored in the flywheel battery 27 can be used more efficiently. Consequently, the flywheel battery 27 does not need to store an unnecessarily large amount of electric power. Accordingly, the size of the flywheel battery 27 can be further reduced.

With the electric power system 1, the flywheel battery control device 35 causes the flywheel battery 27 to perform an electricity discharging operation if the necessary electric power required by the electric motor 43 exceeds a predetermined value. With this configuration, if a large amount of electric power that exceeds the maximum value of the electric power that can be supplied to the electric motor 43 from the main power unit 21 needs to be supplied to the electric motor 43, the flywheel battery control device 35 can cause the flywheel battery 27 to perform the electricity discharging operation. Thus, necessary electric power can be stably supplied to the electric motor 43, and the rated output of the main power unit 21 can be further reduced.

With the electric power system 1, the flywheel battery control device 35 can cause the flywheel battery 27 to perform the electricity storing operation if the necessary electric power required by the electric motor 43 is smaller than or equal to the predetermined value. With this configuration, the flywheel battery control device 35 can cause the flywheel battery 27 to perform the electricity storing operation while electric power supply to the electric motor 43 is not necessary.

With the electric power system 1, the first high-voltage bus 11 and the FCS high-voltage bus 14 are connected such that electric power can be transmitted and received therebetween. With this configuration, the power supply path to the electric motor 43 can be formed into a smart grid. That is to say, the power supply path to the electric motor 43 can be multiplexed. Consequently, a situation where the power supply capacity is significantly lost due to a failure of one main power unit 21 or the like can be suppressed. Accordingly, a more reliable electric power system 1 in which electric power can be more reliably supplied to the electric motor 43 can be realized. Furthermore, for example, if a configuration in which AC power supply buses are electrically connected to each other is employed, it is difficult to adjust the power supply phase and the voltage level for balancing the load of electric power among the AC power supply buses. In contrast, with the configuration in which the first high-voltage bus 11 and the FCS high-voltage bus 14, which are DC buses, are connected to each other as in the present embodiment, such an adjustment operation that requires time and effort is not necessary, and a smart grid can be realized with a simpler configuration.

The electric power system 1 is provided with the FCS high-voltage bus 14 dedicated to the flight control devices (electric actuators 41 and 51, etc.). With this configuration, the influence of voltage fluctuations caused by devices other than the flight control devices reaching the flight control devices can be suppressed. Consequently, electric power can be more reliably supplied stably to the flight control devices. Furthermore, with the configuration in which DC power is supplied to the electric actuators 41 and 51, line loss (power loss) can be further reduced as compared with the case of supplying AC power to the electric actuators 41 and 51.

With the electric power system 1, the first high-voltage bus 11 and the FCS high-voltage bus 14 are connected to each other such that electric power can be transmitted and received therebetween, via the flywheel battery 27 capable of storing and discharging electricity. With this configuration, the flywheel battery 27 disposed between the first high-voltage bus 11 and the FCS high-voltage bus 14 functions as an accumulator, and can thereby suppress an occurrence of an unstable voltage fluctuation caused due to interchange of electric power between the first high-voltage bus 11 and the FCS high-voltage bus 14.

With the electric power system 1, the flywheel battery 27 can temporarily convert the electric power from one of the first high-voltage bus 11 and the FCS high-voltage bus 14 into the kinetic energy of the flywheel 271, thereafter convert this kinetic energy into electric power, and then output the electric power to other buses. With this configuration, an occurrence of a short circuit between the first high-voltage bus 11 and the FCS high-voltage bus 14 can be suppressed. That is to say, electric insulation between the first high-voltage bus 11 and the FCS high-voltage bus 14 can be realized. Accordingly, an occurrence of an unstable voltage fluctuation caused due to interchange of electric power between the DC buses 11, 14 can be more reliably suppressed.

With the electric power system 1, the main power units 22 and 23 are connected to the first high-voltage bus 11. With this configuration, even if a failure occurs in one of the main power units 22 and 23, electric power can be supplied from the other of the main power units 22 and 23. Accordingly, electric power can be more reliably supplied to the electric devices such as the air conditioner 31.

With the aileron drive apparatus 40 according to the present embodiment, the flywheel battery 27 can temporarily supply electric power to the electric actuator 41 while electric power from the main power unit 21 is applied to the electric actuator 41. With this configuration, as mentioned above, a large current (inertial acceleration current) is temporarily required in order that the electric actuator 41 begins to operate. In this case, the flywheel battery 27 can supply electric power to the electric actuator 41. Accordingly, the aforementioned large current can be supplied to the electric actuator 41 as a result of electric power being output to the electric actuator 41 simultaneously from the main power unit 21 and the flywheel battery 27. Therefore, the large current does not need to be generated using only the main power unit 21. Accordingly, the rated output of the main power unit 21 does not need to be increased to the extent that the main power unit 21 can instantaneously supply a required large current to the electric actuator 41, and the rated output can be further reduced. Thus, the size (weight) of the main power unit 21 and the engine 103L serving as a motor for driving the main power unit 21 can be further reduced. As a result, the aileron drive apparatus 40 can be provided with which a large amount of electric power can be supplied to the electric actuator 41 and an increase in the size of the main power unit 21 can be suppressed.

With the aileron drive apparatus 40, the flywheel battery control device 35 can set the amount of electricity discharge from the flywheel battery 27 in accordance with the state of power consumption by the electric actuator 41. Thus, electric power generated by the flywheel battery 27 can be used more efficiently. Consequently, the flywheel battery 27 does not require an unnecessarily large rated output. Accordingly, the size of the flywheel battery 27 can be further reduced.

With the aileron drive apparatus 40, the flywheel battery control device 35 detects the load of the electric actuator 41, and operates the flywheel battery 27 based on a result of the detection. With this configuration, an output appropriate for the load of the electric actuator 41 can be supplied from the flywheel battery 27 to the electric actuator 41. In the present embodiment, the flywheel battery control device 35 supplies electric power required by the electric actuator 41 to the electric actuator 41 using feedforward control, and a voltage decrease in the electric actuator 41 can thereby be more reliably suppressed.

In the aileron drive apparatus 40, the flywheel battery control device 35 and the motor driver 45 are separately disposed, and are communicably connected via the communication line 44. With this configuration, the flywheel battery control device 35 and the motor driver 45 can be separately disposed. Thus, the flywheel battery control device 35 and the motor driver 45 can be maintained individually. Accordingly, the maintainability of the aileron drive apparatus 40 can be further enhanced.

With the aileron drive apparatus 40, the motion conversion mechanism 46, the electric motor 43, and the motor driver 45 are disposed adjacent to one another. With this configuration, as a result of adjacently disposing the motion conversion mechanism 46, the electric motor 43, and the motor driver 45, the motion conversion mechanism 46, the electric motor 43, and the motor driver 45 can be maintained collectively. Accordingly, the maintainability of the aileron drive apparatus 40 can be further enhanced.

With the aileron drive apparatus 40, the aileron control device 42 and the flywheel battery control device 35 are formed integrally. With this configuration, the aileron control device 42 and the flywheel battery control device 35 can share information, and the control accuracy for the electric actuator 41 and the control accuracy for the flywheel battery 27 can be further increased. Furthermore, the overall size of the aileron control device 42 and the flywheel battery control device 35 can be reduced.

With the aileron drive apparatus 40, the flywheel battery 27 is of an inverter-controlled type. With this configuration, since regenerative electric power from the electric actuator 41 can be returned to the flywheel battery 27, energy saving in the electric actuator 41 can be realized through a further increase in electric power use efficiency. Moreover, a reduction in the amount of heat generated in the electric actuator 41 can be realized.

With the aileron drive apparatus 40, the flywheel battery 27 can supply electric power to the electric actuator 41 by converting kinetic energy generated by a rotation of the flywheel 271 into electric power. With this configuration, a large current can be instantaneously applied from the flywheel battery 27 to the electric actuator 41 when a large current needs to flow through the electric actuator 41, by rotating the flywheel 271 and storing kinetic energy in the flywheel 271 in advance. That is to say, the flywheel battery 27 with a high responsiveness with respect to an electricity discharge request can be realized.

With the aileron drive apparatus 40, a large current can be applied from the main power unit 21 and the flywheel battery 27 to the electric actuator 41 for the flight control system that receives a large driving resistance during a flight of the aircraft 100. Accordingly, the electric actuator 41 can be operated with a larger force.

Second Embodiment

Figure 7:
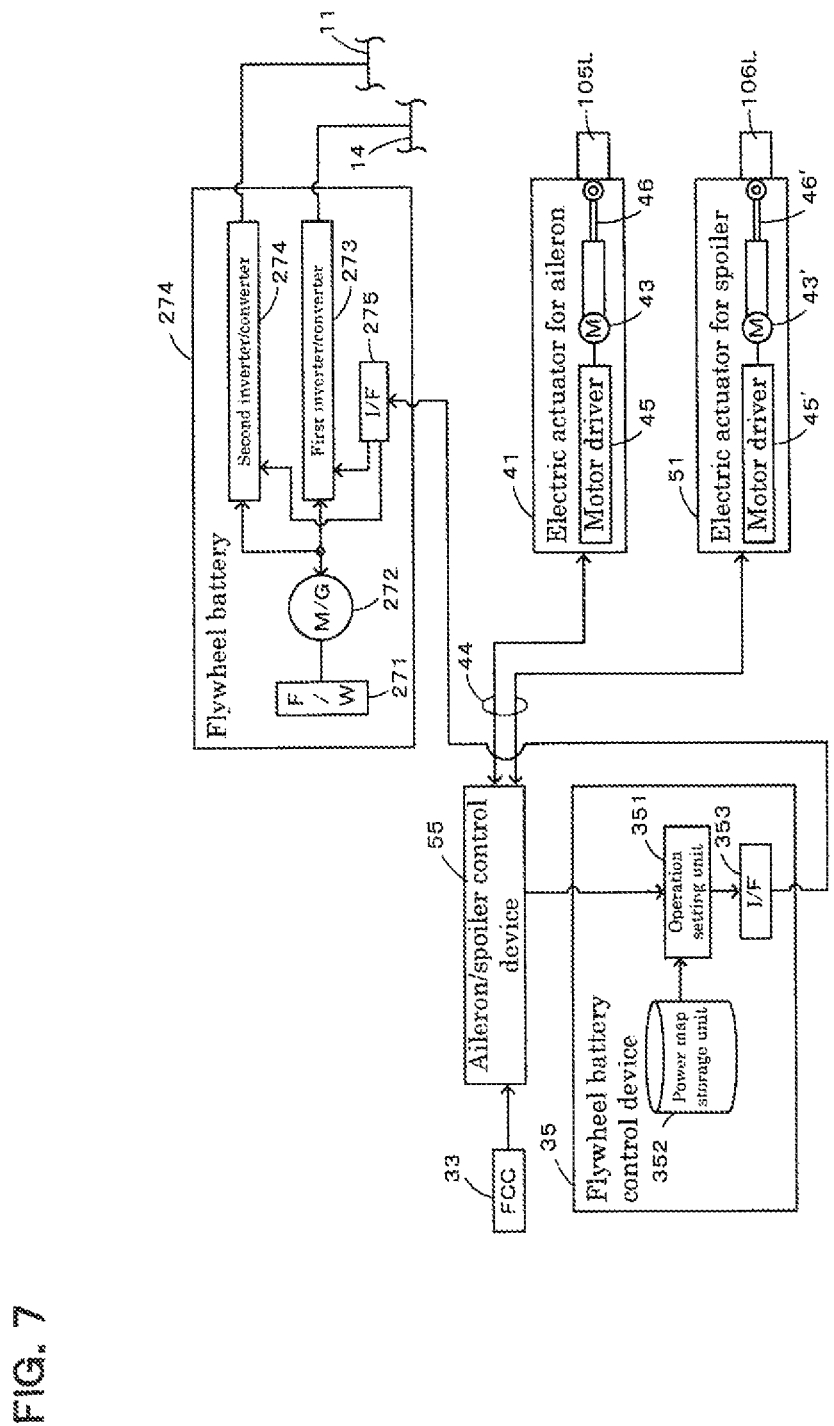
FIG. 7 is a schematic view for illustrating a main part of a second embodiment of the present invention.

FIG. 7 is a schematic view for illustrating a main part of a second embodiment of the present invention. Referring to FIG. 7, in the present embodiment, an aileron/spoiler control device 55 is provided in place of the aileron control device 42 and the spoiler control device 52. The aileron/spoiler control device 55 is configured to control operations of the plurality of electric actuators 41 and 51.

Note that configurations that are different from those in the above embodiment will be mainly described below, and configurations that are similar to those in the above embodiment will be given similar reference numerals and will not be described in detail.

The aileron/spoiler control device 55 generates a PWM control signal for driving the electric motor 43 in the electric actuator 41 for an aileron, based on a control signal from the flight control computer 33, and outputs this PWM control signal to the motor driver 45 in the electric actuator 41. Similarly, the aileron/spoiler control device 55 generates a PWM control signal for driving an electric motor 43' in the electric actuator 51 for a spoiler, based on a control signal from the flight control computer 33, and outputs this PWM control signal to a motor driver 45'.

At the time of the aforementioned control, the aileron/spoiler control device 55 generates the PWM control signal by using feedback control using a rotational position signal, a rotational speed signal, and a current signal of the electric motor 43 in the electric actuator 41 for an aileron. Similarly, the aileron/spoiler control device 55 generates the PWM control signal by using feedback control using a rotational position signal, a rotational speed signal, and a current signal of the electric motor 43' in the electric actuator 51 for a spoiler. The aileron/spoiler control device 55 outputs the rotational speed signal and the current signal of the electric motors 43 and 43' to the flywheel battery control device 35.

The operation setting unit 351 in the flywheel battery control device 35 controls operations of the flywheel battery 27 in accordance with the state of power consumption by loads of the plurality of electric motors 43 and 43' connected to the FCS high-voltage bus 14. Specifically, the operation setting unit 351 in the flywheel battery control device 35 receives the rotational speed signal and the current signal of the electric motors 43 and 43' from the aileron/spoiler control device 55. The operation setting unit 351 then references the rotational speed signal and the current signal, as well as maps stored in the power map storage unit 352, and detects (estimates) a total value of necessary current values (electric power amounts) for operations of the respective electric motors 43 and 43'.

Note that a map corresponding to the electric motor 43 in the electric actuator 41 for an aileron and a map corresponding to the electric motor 43' in the electric actuator 51 for a spoiler are provided. These maps are stored in the power map storage unit 352. The map corresponding to the electric motor 43' in the electric actuator 51 for a spoiler is set similarly to the map corresponding to the electric motor 43 in the electric actuator 41 for an aileron shown in FIG. 4.

The operation setting unit 351 detects the total value of the electric power amounts required by the respective electric motors 43 and 43' by performing the above processing, and determines based on this total value whether or not a power generating operation by the flywheel battery 27 is necessary. If the operation setting unit 351 determines that the power generating operation by the flywheel battery 27 is necessary, the operation setting unit 351 controls the first inverter/converter 273 so as to cause the flywheel battery 27 to perform the power generating operation.

On the other hand, if the operation setting unit 351 determines that the power generating operation by the flywheel battery 27 is not necessary, the operation setting unit 351 controls the second inverter/converter 274 so as to cause the flywheel battery 27 to perform an electricity storing operation (rotational operation of the flywheel 271).

As a result, according to the present embodiment, the following effects can be achieved in addition to the effects of the first embodiment. That is to say, the flywheel battery control device 35 can operate the flywheel battery 27 based on the total value of the necessary electric power for operations of the respective electric actuators 41 and 51. With this configuration, even if the electric actuators 41 and 51 operate simultaneously, a larger amount of electric power than the amount applied from the main power unit 21 can be supplied to the electric actuators 41 and 51. Furthermore, the electric power applied to the electric actuators 41 and 51 can be collectively controlled by one flywheel battery control device 35. Thus, the flywheel battery control device 35 can control the flywheel battery 27 using combined information from the electric actuators 41 and 51. Accordingly, the flywheel battery control device 35 can perform electric power control for the electric actuators 41 and 51 with more accuracy.

According to the present embodiment, the aileron/spoiler control device 55 can control operations of the electric actuators 41 and 51, and output signals for specifying the operational state of the electric actuators 41 and 51 to the flywheel battery control device 35. With this configuration, the aileron/spoiler control device 55 can configure an integrated system having a function of controlling the electric actuators 41 and 51 and a function of giving data for controlling the electric actuators 41 and 51 to the flywheel battery control device 35.

Third Embodiment

Figure 8:
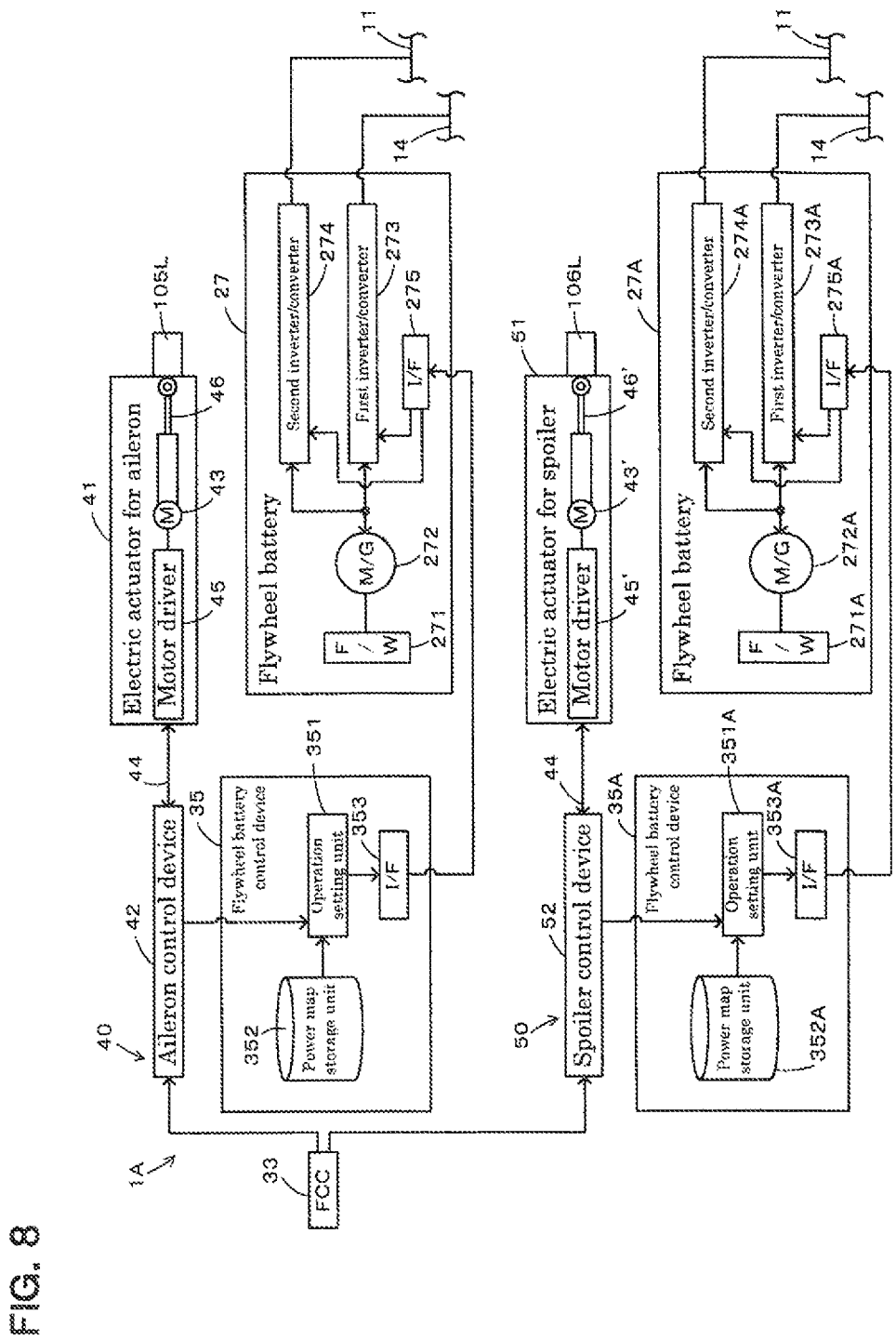
FIG. 8 is a schematic view for illustrating a main part of a third embodiment of the present invention.

Next, a third embodiment of the present invention will be described. FIG. 8 is a schematic view for illustrating a main part of a third embodiment of the present invention. Referring to FIG. 8, in the third embodiment, flywheel batteries 27 and 27A are provided respectively for the electric actuators 41 and 51. Specifically, an electric power system 1A further has the flywheel battery 27A and a flywheel battery control device 35A in relation to the spoiler control device 52. Thus, further decentralized arrangement of power supplies is realized as a result of provision of the flywheel battery 27A in addition to the flywheel battery 27, and a further increase in electric power use efficiency is thereby achieved.

The flywheel battery control device 35A has a configuration that is similar to that of the flywheel battery unit 35. Specifically, the flywheel battery control device 35A has an operation setting unit 351A, a power map storage unit 352A, and an interface unit 353A.

The flywheel battery 27A has a configuration that is similar to that of the flywheel battery 27. Specifically, the flywheel battery 27A has a flywheel 271A, a motor generator 272A, a first inverter/converter 273A, a second inverter/converter 274A, and an interface unit 275A.

The spoiler control device 52 generates a PWM control signal for driving the electric motor 43' in the electric actuator 51 in the spoiler drive apparatus 50, based on a control signal from the flight control computer 33, and outputs this PWM control signal to a motor driver 45'.

At the time of the aforementioned control, the spoiler control device 52 generates the PWM control signal by using feedback control using a rotational position signal, a rotational speed signal, and a current signal of the electric motor 43' in the electric actuator 51 in the spoiler drive apparatus 50.

The spoiler control device 52 outputs the rotational speed signal and the current signal of the electric motor 43' in the electric actuator 51 in the spoiler drive apparatus 50 to the operation setting unit 351A in the flywheel battery control device 35A.

The operation setting unit 351A receives the aforementioned rotational speed signal and current signal of the electric motor 43' from the spoiler control device 52. The operation setting unit 351A then references the rotational speed signal and the current signal, as well as the map stored in the power map storage unit 352A, and detects (estimates) the electric power amount required by the electric motor 43'.

The operation setting unit 351A calculates the necessary electric power amount required by the electric motor 43' by performing the above processing, and determines based on the necessary electric power amount whether or not a power generating operation by the flywheel battery 27A is necessary. If the operation setting unit 351A determines that the power generating operation by the flywheel battery 27A is necessary, the operation setting unit 351A controls the first inverter/converter 273A so as to cause the flywheel battery 27A to perform the power generating operation.

On the other hand, if the operation setting unit 351A determines that the power generating operation by the flywheel battery 27A is not necessary, the operation setting unit 351A controls the second inverter/converter 274A so as to cause the flywheel battery 27A to perform an electricity storing operation (rotational operation of the flywheel 271A).

Figure 9:
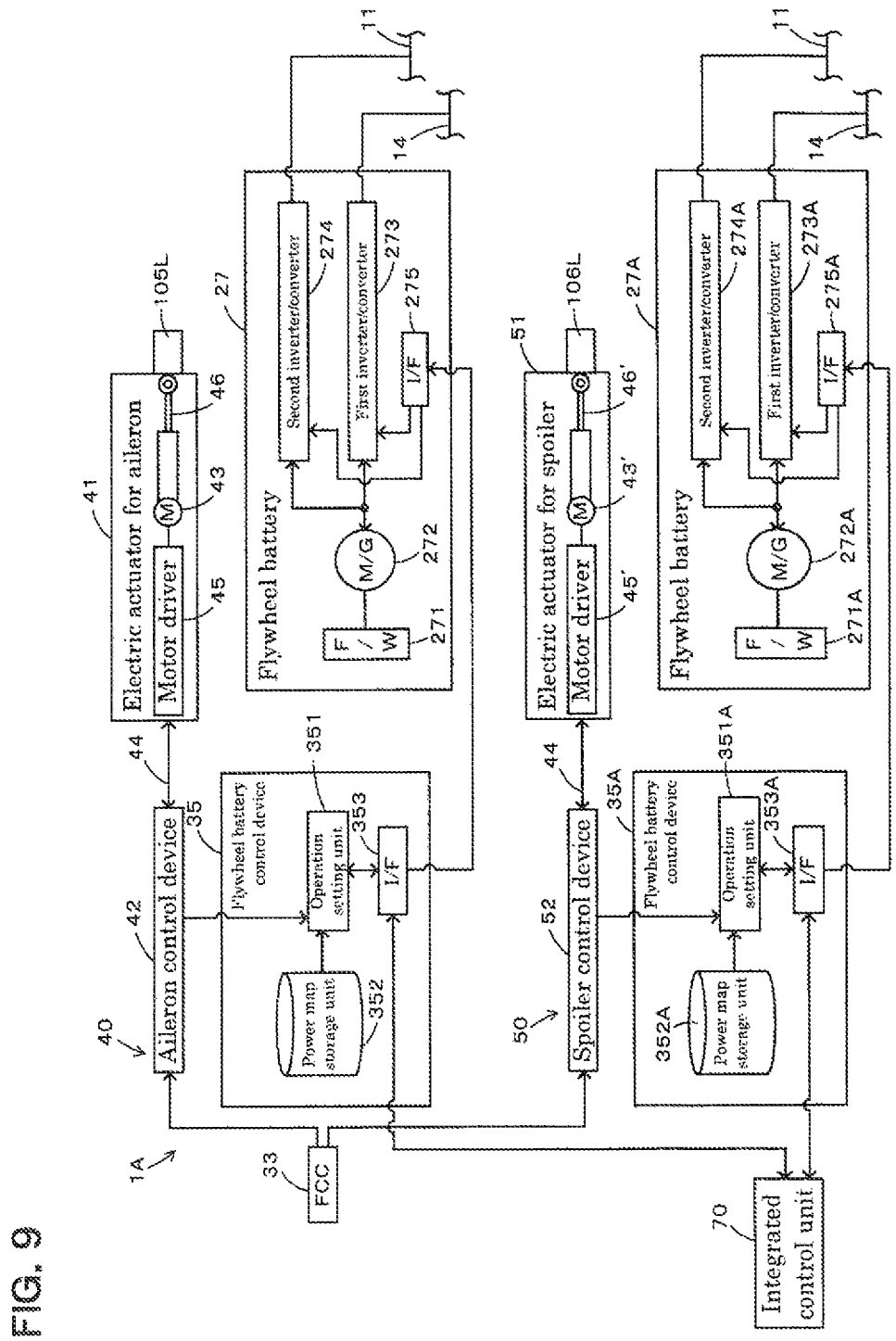
FIG. 9 is a schematic view for illustrating a modification of the third embodiment of the present invention.

Note that an integrated control unit 70 that integrally controls the two flywheel battery control devices 35 and 35A may further be provided as shown in FIG. 9. The integrated control unit 70 includes a CPU, a RAM, a ROM, and the like. In this case, the integrated control unit 70 outputs a control signal to the two flywheel battery control devices 35 and 35A as appropriate, in accordance with the operational state of the two electric actuators 41 and 51. Thus, electric power interchange between the two flywheel batteries 27 and 27A can be performed.

Fourth Embodiment

Figure 10:
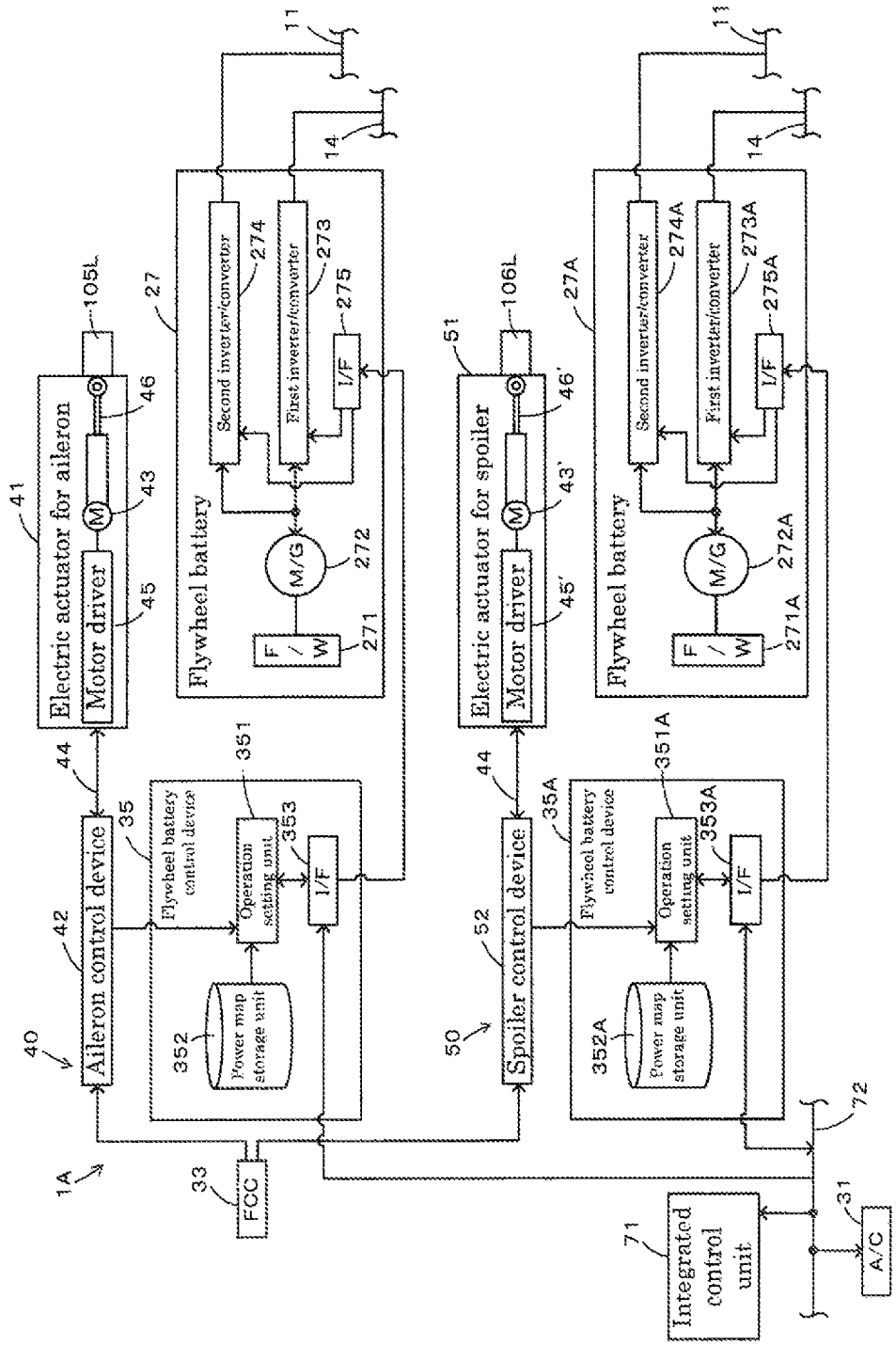
FIG. 10 is a schematic view showing a main part of a fourth embodiment of the present invention.

FIG. 10 is a schematic view showing a main part of a fourth embodiment of the present invention. Referring to FIG. 10, in the present embodiment, an integrated control unit 71 and a power control bus 72 are provided in addition to the configurations in the third embodiment shown in FIG. 8. The integrated control unit 71 includes a CPU, a RAM, a ROM, and the like.

In the present embodiment, the integrated control unit 71 controls the flywheel battery control devices 35 and 35A based on necessary electric power for electric devices connected to the first high-voltage bus 11 and the FCS high-voltage bus 14.

The integrated control unit 71 is connected to the operation setting units 351 and 351A in the respective flywheel battery control devices 35 and 35A via the power control bus 72 and the interface units 353 and 353A. The integrated control unit 71 is also connected to electric devices (air conditioner 31 etc.) to which electric power is supplied from the first high-voltage bus 11, via the power control bus 72. The integrated control unit 71 calculates the necessary electric power amount required by these electric devices, based on values of the current that flows through the electric devices that receive a supply of electric power from the first high-voltage bus 11, and the like. The integrated control unit 71 also references signals from the operation setting units 351 and 351A and calculates the necessary electric power amounts for the respective electric motors 43 and 43'. That is to say, the integrated control unit 71 detects the necessary electric power amount for the first high-voltage bus 11 and the necessary electric power amount for the FCS high-voltage bus 14.

The integrated control unit 71 then operates one of the flywheel batteries 27 and 27A so as to distribute electric power from a bus among the first high-voltage bus 11 and the FCS high-voltage bus 14 that has a relatively larger reserve capacity of electric power distribution to one of the flywheel batteries 27 and 27A. The integrated control unit 71 also operates the other of the flywheel batteries 27 and 27A so as to output electric power from the other of the flywheel batteries 27 and 27A to a bus among the first high-voltage bus 11 and the FCS high-voltage bus 14 that has a relatively smaller reserve capacity of electric power distribution.

Note that electric power from a bus among the first high-voltage bus 11 and the FCS high-voltage bus 14 that has a relatively larger reserve capacity of electric power distribution may be supplied to the motor generators 272 in the flywheel batteries 27 and 27A, and electric power generated by driving these motor generators 272 may be supplied to the other bus.

As a result, according to the present embodiment, the integrated control unit 71 can operate the flywheel batteries 27 and 27A so as to distribute electric power from one of the first high-voltage bus 11 and the FCS high-voltage bus 14 having a relatively larger reserve capacity of electric power distribution to the flywheel batteries 27 and 27A. The integrated control unit 71 can also cause electric power to be output from the flywheel batteries 27 and 27A to one of the first high-voltage bus 11 and the FCS high-voltage bus 14 having a relatively smaller reserve capacity of electric power distribution. With this configuration, biasing of electric power loads between the first high-voltage bus 11 and the FCS high-voltage bus 14 can be further reduced. Accordingly, the rated output of the main power units 21 to 23 and the flywheel battery 27 can be further reduced, and consequently, the size and weight of the main power units 21 to 23, the flywheel battery 27, and the like can be further reduced.

Modifications

Although the embodiments of the present invention have been described above, needless to say, all modifications, applications, and equivalents thereof that fall within the claims, for which modifications and applications would become apparent by reading and understanding the present specification, are intended to be embraced in the scope of the present invention. For example, the present invention may be modified as below for implementation.

(1) The above embodiments have been described, taking, as an example, a mode in which the auxiliary power unit and the ram air turbine are provided. However, this need not be the case. In the above embodiments, since electric power interchange among a plurality of DC buses can be performed by using a smart grid, at least one of the auxiliary power unit and the ram air turbine may be omitted. The size and weight of the electric power system can be further reduced by at least one of the auxiliary power unit and the ram air turbine being omitted.

(2) The above embodiments have been described, taking, as an example, a mode in which the main power units, the auxiliary power unit, the ram air turbine, and the motor generator in the flywheel battery are AC power units. However, this need not be the case. For example, at least one of the main power units, the auxiliary power unit, the ram air turbine, and the motor generator in the flywheel battery may be a DC power unit. With this configuration, regarding the DC power unit, an auto transformer rectifier unit (ATRU; AC/DC converter) can be omitted. Consequently, the size and weight of the electric power system can be further reduced.

(3) In the above embodiments, other kinds of battery capable of storing and discharging electricity, such as a fuel battery or a supercapacitor, may be used in place of the flywheel battery. In the case of using the aforementioned fuel battery, a larger electricity storage capacity can be reserved, and water discharged from the fuel battery can also be reused.

(4) The above embodiments have been described, taking an aileron and a spoiler as examples of the control surfaces operated by the electric actuators. However, this need not be the case. For example, the present invention may be applied to other control surfaces, such as an elevator, a rudder, and a flap. Furthermore, the present invention may be applied to an electric actuator that drives a leg of landing gear or the like serving as a device installed in an aircraft.

The present invention can be widely applied to aircraft electric power systems.

What is claimed is:

1. An aircraft electric power system provided in an aircraft, comprising:
    a predetermined DC power supply bus for supplying electric power to a load,
    wherein the DC power supply bus is configured to always be connected to two or more types of power supply devices having different forms;
    a main power unit which is provided in one of the power supply devices and is driven by an engine for applying a thrust force to the aircraft;
    an electricity storage control device which is provided in another of the power supply devices and is capable of storing and discharging electricity;
    an electricity storage control device which controls the electricity storage device,
    wherein the electricity storage control device controls an operation of the electricity storage device in accordance with a state of power consumption by one or more loads connected to the DC power supply bus.

2. The aircraft electric power system according to claim 1, wherein the electricity storage control device can cause the electricity storage device to perform an electricity discharging operation if necessary electric power required by the one or more loads exceeds a predetermined value.

3. The aircraft electric power system according to claim 1, wherein the electricity storage control device can cause the electricity storage device to perform an electricity storing operation if necessary electric power required by the one or more loads is smaller than or equal to a predetermined value.

4. The aircraft electric power system according to claim 1, wherein a plurality of the predetermined DC power supply buses are provided, and
    one of the predetermined DC power supply buses and another of the predetermined DC power supply buses are connected to each other such that electric power can be transmitted and received therebetween.

5. The aircraft electric power system according to claim 4, wherein one of the predetermined DC power supply buses is a DC power supply bus that is connected only to a flight control system for supplying electric power to a flight control device for controlling a flight of the aircraft.

6. The aircraft electric power system according to claim 4, wherein one of the predetermined DC power supply buses and another of the predetermined DC power supply buses are connected to each other such that electric power can be transmitted and received therebetween, via an electricity storage device capable of storing and discharging electricity.

7. The aircraft electric power system according to claim 6, wherein the electricity storage device includes a flywheel battery.

8. The aircraft electric power system according to claim 6, further comprising an electricity storage control device for controlling the electricity storage device,
    wherein the electricity storage control device can operate the electricity storage device so as to distribute electric power from a DC power supply bus among the predetermined DC power supply buses that has a relatively larger reserve capacity of electric power distribution to the electricity storage device, and can also cause electric power to be output from the electricity storage device to a DC power supply bus among the predetermined DC power supply buses that has a relatively smaller reserve capacity of electric power distribution.

9. The aircraft electric power system according to claim 1, wherein one of the power supply devices includes a plurality of main power units driven by an engine for applying a thrust force to the aircraft, and
    the main power units are connected to the DC power supply bus.

* * * * *